United States Patent
Harkude et al.

(10) Patent No.: US 10,970,059 B2
(45) Date of Patent: Apr. 6, 2021

(54) SYSTEMS AND METHODS FOR UPDATING FIRMWARE AND CRITICAL CONFIGURATION DATA TO SCALABLE DISTRIBUTED SYSTEMS USING A PEER TO PEER PROTOCOL

(71) Applicant: Honeywell International Inc., Morristown, NJ (US)

(72) Inventors: Chandramohan Harkude, Bangalore (IN); Sreejith Naarakathil, Bangalore (IN); Deepu Paul, Ernakulam (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/206,403

(22) Filed: Nov. 30, 2018

(65) Prior Publication Data

US 2020/0301691 A1 Sep. 24, 2020

(51) Int. Cl.
*G06F 8/65* (2018.01)
*H04L 29/08* (2006.01)
*G06F 16/23* (2019.01)

(52) U.S. Cl.
CPC ............ *G06F 8/65* (2013.01); *G06F 16/2365* (2019.01); *G06F 16/2379* (2019.01); *H04L 67/06* (2013.01)

(58) Field of Classification Search
CPC ....... H04L 67/06; G06F 8/65; G06F 16/2379; G06F 16/2365
See application file for complete search history.

(56) References Cited

U.S. PATENT DOCUMENTS

| | | | | |
|---|---|---|---|---|
| 7,383,541 B1* | 6/2008 | Banks | ........................ | G06F 8/65 717/126 |
| 7,685,281 B1* | 3/2010 | Saraiya | .................. | G06F 13/387 709/226 |
| 7,987,152 B1* | 7/2011 | Gadir | .................... | G06F 16/256 707/602 |
| 8,606,846 B2* | 12/2013 | Czechowski, III | ........................ | H04L 67/1012 709/203 |
| 9,106,668 B2* | 8/2015 | Chalouhi | ............... | H04L 67/104 |
| 9,374,395 B2 | 6/2016 | Barton et al. | | |
| 9,432,298 B1* | 8/2016 | Smith | ................. | H04L 49/9057 |
| 10,749,790 B2* | 8/2020 | Mestery | .................. | H04L 45/16 |
| 10,749,949 B2* | 8/2020 | Mosko | .................. | H04L 63/102 |
| 2005/0229173 A1* | 10/2005 | Mihm | ....................... | G06F 8/65 717/171 |

(Continued)

*Primary Examiner* — Marina Lee
(74) *Attorney, Agent, or Firm* — Seager, Tutte & Wickhem, LLP (57) ABSTRACT

Systems and methods for updating firmware or other critical configuration data in scalable distributed systems are provided. Such systems and methods can include (1) a master controller receiving (a) a firmware update file that is divided into a plurality of packets and (b) a metadata file that is associated with the firmware update file and (2) a first one of a plurality of slave controllers receiving the metadata file and, responsive thereto, updating a local peer table to include entries for the master controller and a group of the plurality of slave controllers that are available to share any of the plurality of packets and downloading each of the plurality of packets from a combination of the master controller and the group of the plurality of slave controllers.

18 Claims, 6 Drawing Sheets

(56) References Cited

U.S. PATENT DOCUMENTS

| | | | |
|---|---|---|---|
| 2006/0153127 A1* | 7/2006 | Lee | H04W 28/20 709/226 |
| 2008/0261644 A1* | 10/2008 | Bauer | H04N 21/41422 455/517 |
| 2009/0313312 A1* | 12/2009 | Colbeck | G06F 16/10 |
| 2009/0319502 A1* | 12/2009 | Chalouhi | H04L 67/1046 |
| 2011/0161468 A1* | 6/2011 | Tuckey | H04L 41/0803 709/220 |
| 2012/0216183 A1* | 8/2012 | Mahajan | G06F 8/65 717/170 |
| 2013/0097333 A1* | 4/2013 | Bathurst | H04L 65/4076 709/231 |
| 2013/0326495 A1* | 12/2013 | Reunamaki | H04W 4/80 717/173 |
| 2015/0022666 A1* | 1/2015 | Kay | H04L 65/4084 348/159 |
| 2015/0188975 A1* | 7/2015 | Hansen | H04N 21/8113 709/231 |
| 2016/0337437 A1* | 11/2016 | Gartsbein | H04L 67/06 |
| 2017/0085488 A1* | 3/2017 | Bhattacharya | H04L 41/0806 |
| 2018/0295150 A1* | 10/2018 | Oikarinen | H04L 67/42 |
| 2019/0045304 A1* | 2/2019 | Bhalla | H04R 3/00 |
| 2019/0191372 A1* | 6/2019 | Murali | H04W 52/0216 |
| 2020/0162543 A1* | 5/2020 | Mosko | H04L 67/104 |

\* cited by examiner

SYSTEMS AND METHODS FOR UPDATING FIRMWARE AND CRITICAL CONFIGURATION DATA TO SCALABLE DISTRIBUTED SYSTEMS USING A PEER TO PEER PROTOCOL

FIELD

The present invention relates generally to systems and methods for updating firmware and critical configuration data to scalable distributed systems. More particularly, the present invention relates to systems and methods for using a peer to peer protocol to update the firmware and the critical configuration data for control panels and sensors in the scalable distributed systems.

BACKGROUND

Known systems and methods for updating firmware for control panels and sensors download an entire firmware file from a single source. For example, known systems and methods can include multiple ones of the control panels and sensors downloading firmware files from a local or cloud server and the local or cloud server transmitting full versions of the firmware files to requesting ones of the control panels and sensors. However, such known systems and methods require high bandwidth connections, take a long time to propagate the firmware files, and/or lack robust protection from network failures.

In view of the above, there is a continuing, ongoing need for improved systems and methods.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for deploying firmware updates or other critical configuration data to control panels and sensors. Such systems and methods can include a master controller, such as a first control panel, and a plurality of slave controllers, such as a plurality of other control panels and/or a plurality of sensors. Initially, the master controller can receive (1) a firmware update file that is divided into a plurality of packets and (2) a metadata file that is associated with the firmware update file. In some embodiments, the master controller can receive the firmware update file and the metadata file from a local server via a local area network. Additionally or alternatively, in some embodiments, the master controller can receive the firmware update file and the metadata file from a cloud server via a wide area network. Furthermore, in some embodiments, the master controller can be designated as such prior to receiving the firmware update file and the metadata file. Additionally or alternatively, in some embodiments, a first device to receive the firmware update file and the metadata file can be designated as the master controller.

In accordance with disclosed embodiments, each of the plurality of slave controllers can receive the metadata file. For example, in some embodiments, the metadata file can include address information for the plurality of slave controllers, and the master controller can use the address information in the metadata file to identify nearest ones of the plurality of slave controllers to the master controller, update its local peer table accordingly, and transmit the metadata file to its nearest ones of the plurality of slave controllers. Then, each of nearest ones of the plurality of slave controllers can use the address information in the metadata file to identify its nearest one of the master controller and the plurality of slave controllers, update its local peer table accordingly, and transmit the metadata file to its nearest ones of the plurality of slave controllers. This process of identifying the nearest ones of the plurality of slave controllers and transmitting the metadata file thereto can continue indefinitely to ensure that the metadata file continues to be transmitted as updates thereto are made.

Additionally or alternatively, in some embodiments, each of the master controller and the plurality of slave controllers can transmit broadcast messages and, responsive to receiving the broadcast messages, each of the master controller and the plurality of slave controllers can determine a respective distance to a broadcasting one of the master controller and the plurality of slave controllers, update its local peer table accordingly, and solicit the metadata file from a nearest one of the master controller and the plurality of slave controllers. For example, in some embodiments, the broadcast messages can include a respective network address of the broadcasting one of the master controller and the plurality of slave controllers. This process of identifying the nearest one of the master controller and the plurality of slave controllers and soliciting the metadata file therefrom can continue indefinitely to ensure that the master controller and the plurality of slave controllers continue to receive the metadata file as updates thereto are made.

In any embodiment, prior to transmitting the metadata file, the broadcasting one of the master controller and the plurality of slave controllers can update the metadata file to include information indicative of (1) to which of the plurality of slave controllers the broadcasting one of the master controller and the plurality of slave controllers has transmitted any of the plurality of packets in the firmware update file and (2) which ones of the plurality of packets in the firmware update file the broadcasting one of the master controller and the plurality of slave controllers has transmitted to each of the plurality of slave controllers.

Below, systems and methods are disclosed herein in connection with methods executed by a first one of the plurality of slave controllers. However, it is to be understood that each of the plurality of slave controllers can execute and control similar methods simultaneously therewith.

Responsive to receiving the metadata file, the first one of the plurality of slave controllers can update its local peer table to include entries for the master controller and a group of the plurality of slave controllers that are available to share any of the plurality of packets in the firmware update file (even though some of the group of the plurality of slave controllers may be only partially seeded with some of the plurality of packets in the firmware update file) and to identify which ones of the plurality of packets in the firmware update file are available to download from each of the master controller and the group of the plurality of slave controllers. Then, the first one of the plurality of slave controllers can download the plurality of packets in the firmware update file from a combination of the master controller and the group of the plurality of slave controllers. In some embodiments, each of the plurality of packets in the firmware update file can be encoded to a respective key identified in the metadata file, and the first one of the plurality of slave controllers can use the respective key for each of the plurality of packets in the metadata file to track which ones of the plurality of packets in the firmware update file have been downloaded thereto and which ones of the plurality of packets in the firmware update file have not yet been downloaded thereto. Accordingly, the first one of the plurality of slave controllers can initiate downloading thereto only those ones of the plurality of packets in the firmware update file that have not yet been downloaded to the first one of the plurality of slave controllers. The first one of the plurality of slave controllers can continue execution of methods disclosed herein until the first one of the plurality of slave controllers has downloaded all of the plurality of packets in the firmware update file.

When more than one of the master controller and the group of the plurality of slave controllers are available to share one of the plurality of packets in the firmware update file, the first one of the plurality of slave controllers can identify which of the master controller and the group of the plurality of slave controllers to download the one of the plurality of packets therefrom by identifying the nearest one of the master controller and the group of the plurality of slave controllers from its local peer table and/or by identifying a least loaded one of the master controller and the group of the plurality of slave controllers. For example, in some embodiments, each of the master controller and the group of the plurality of slave controllers can identify a respective processing load of a respective processor, such as CPU cycles per predetermined time period, in the broadcast messages and transmit that measurement to the first one of the plurality of slave controllers, which, responsive thereto, can identify the least loaded one of the master controller and the group of the plurality of slave controllers.

In some embodiments, the master controller and the plurality of slave controllers can be coupled together by a field bus, which can facilitate data transmission of the metadata file and the plurality of packets in the firmware update file therebetween. Furthermore, in some embodiments, the master controller and the plurality of slave controllers can utilize timeslot communication methods for communication via the field bus to avoid data collisions and randomness.

As explained above, the plurality of slave controllers can include the plurality of other control panels and/or the plurality of sensors. In some embodiments, the plurality of other control panels and the plurality of sensors can include devices of different types, for example, different types of sensors and different models of control panels. In such embodiments, the firmware update file can be specific to only one of the different types, and the metadata file can include an internal marker or designation of that type. Accordingly, only control panels in the plurality of other control panels or sensors in the plurality of sensors that are the type that matches the internal marker or designation in the metadata file will download the plurality of packets in the firmware update file. For example, in some embodiments, the master controller and the group of the plurality of slave controllers will only transmit the plurality of packets in the firmware update file to the plurality of slave controllers of the type identified in the metadata file. Additionally or alternatively, in some embodiments, only the plurality of slave controllers of the type identified in the metadata file will request the plurality of packets in the firmware update file from the master controller and the group of the plurality of slave controllers. Additionally or alternatively, in some embodiments, the master controller will transmit the metadata file only to the plurality of slave controllers of the type identified in the metadata file and only the plurality of slave controllers that receive the metadata file will request and share the plurality of packets in the firmware update file.

Figure 1:
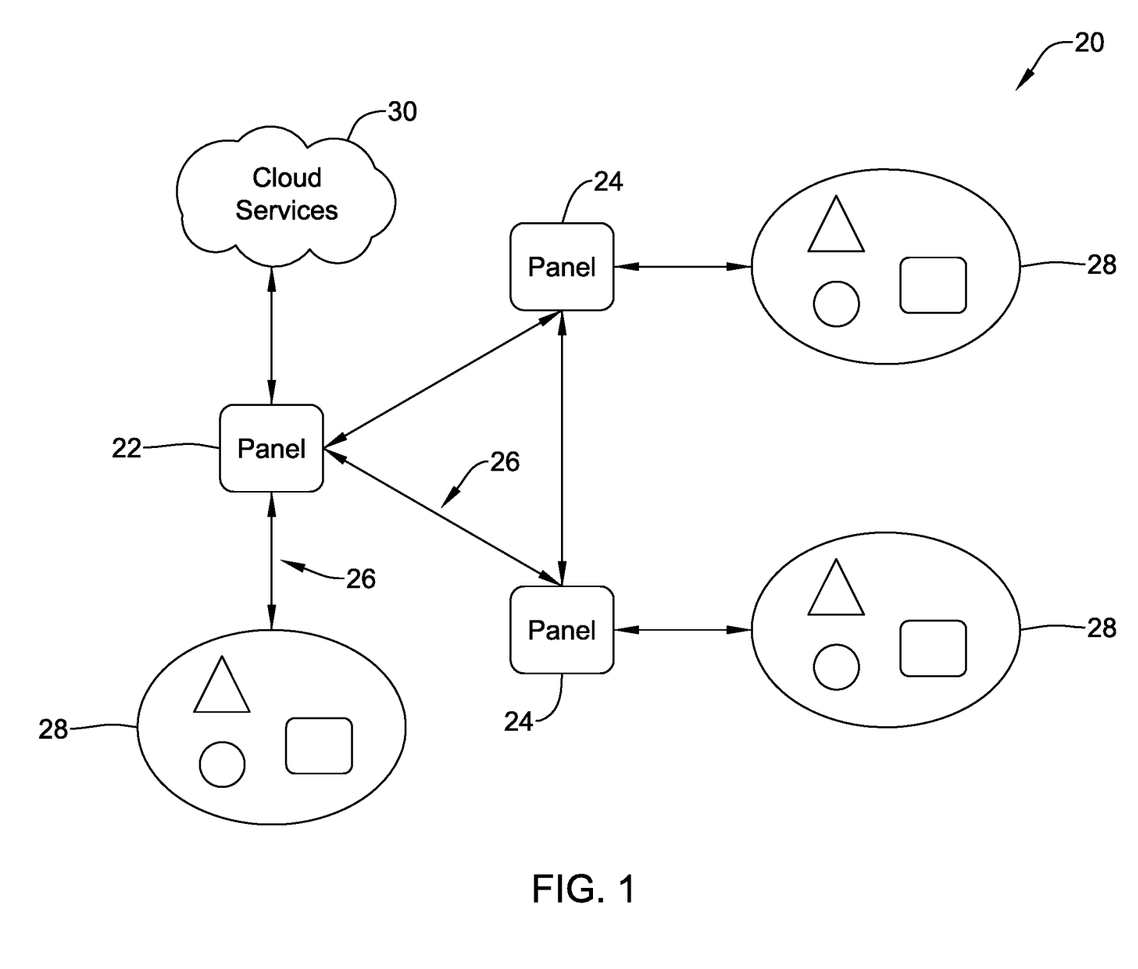
FIG. 1 is a block diagram of a system in accordance with disclosed embodiments.
Figure 2:
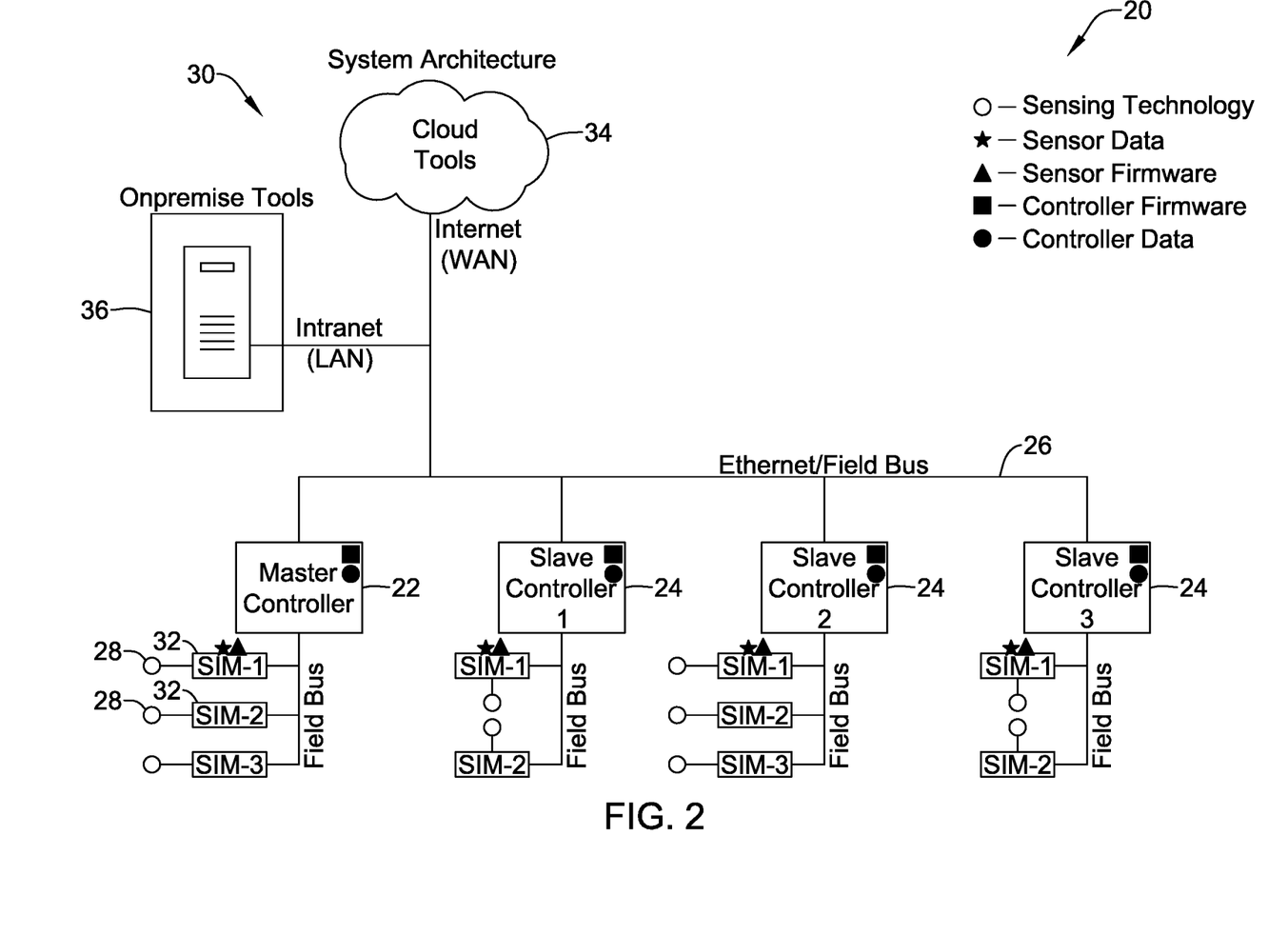
FIG. 2 is a block diagram of a system in accordance with disclosed embodiments.

FIG. 1 and FIG. 2 are block diagrams of a system 20 in accordance with disclosed embodiments. The system 20 can include a master controller 22, a plurality of slave controllers 24, 28, 32, a field bus 26, and an update file source 30. As shown in FIG. 2, the update file source 30 can include one or both of a local server 36 coupled to the master controller 22 via a local area network and a cloud server 34 coupled to the master controller 22 via a wide area network.

In some embodiments, as shown in FIG. 1, only one control panel (the master controller 22) is connected to the internet, but a peer to peer connection between the master controller 22 and the plurality of slave controllers 24, 28, 32 can facilitate a virtual connection between cloud services and subnetworks that include the plurality of slave controllers 24, 28, 32 and the field bus 26. The peer to peer connection can also provide a secure and efficient data transport capability for a firmware configuration file download so that critical data, such as configuration and firmware data, only needs to be downloaded once to the master controller 22, and the rest of the system 20 can receive the critical data via a time slot based data sharing model. When the system 20 scales to larger panel networks with larger subnetworks, the same configuration and firmware download performance can be achieved by adding more master and slave controllers to the system 20.

Figure 3:
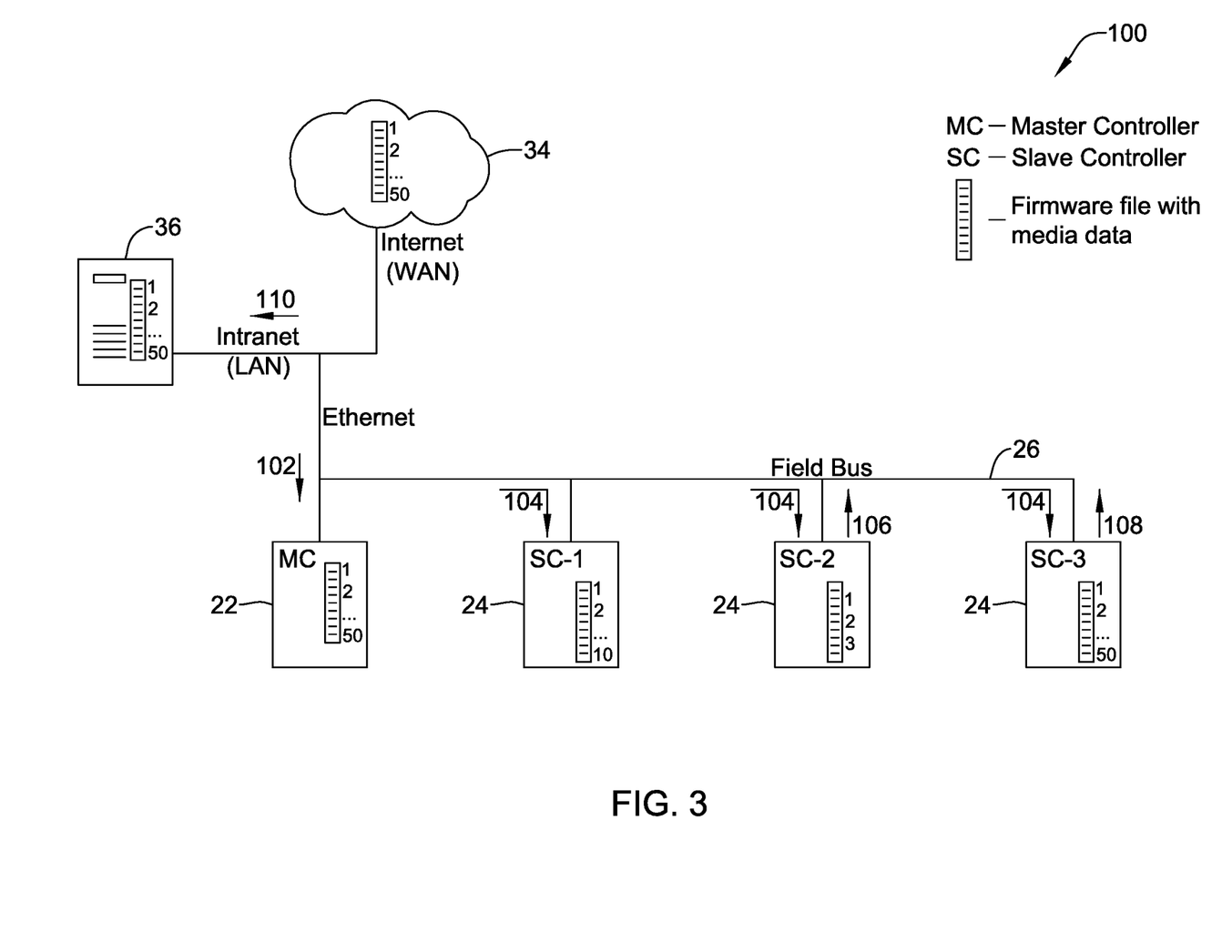
FIG. 3 is a flow diagram of a method in accordance with disclosed embodiments.

FIG. 3 is a flow diagram of a method 100 in accordance with disclosed embodiments and demonstrates how varying a download source can increase robustness of the system 20 as compared to the prior art by reducing bandwidth requirements, increasing a speed of downloading the firmware update file, and protecting against download failure should the download source go offline. Initially, the master controller 22 can download from the update file source 30 (1) a firmware update file that is divided into a plurality of packets and (2) a metadata file that is associated with the firmware update file, as in 102. Then, each of the plurality of slave controllers 24 can download the plurality of packets in the firmware update file from a combination of the master controller 22 and other ones of the plurality of slave controllers 24, as in 104, 106, and 108, such as nearest ones of the master controller 22 and the plurality of slave controllers 24 and least loaded ones of the master controller 22 and the plurality of slave controllers 24. In some embodiments, each the plurality of slave controllers 24 can initiate downloading each of the plurality of packets in the firmware update file responsive to receiving the metadata file from the master controller 22 or other ones of the plurality of slave controllers 24 as disclosed herein.

In some embodiments, as shown in FIG. 3, performance of the system 20 can be improved by employing the local server 36 as a single on premise file server that has high computing power as compared to the master controller 22 and the plurality of slave controllers 24. In such systems, the master controller 22 and the plurality of slave controllers 24 may not have adequate processing power to process the firmware update file and generate required metadata. Therefore, the firmware update file can be downloaded first to the local server 26 from the cloud server 34 via a WAN and processed for easy packet transfer to the master controller 22 and the plurality of slave controllers 24 via a LAN, as in 110. In such deployments, the master controller only needs to communicate with the cloud server 34 via the WAN for status updating and progress, which requires only a minimal data processing capability.

Figure 4:
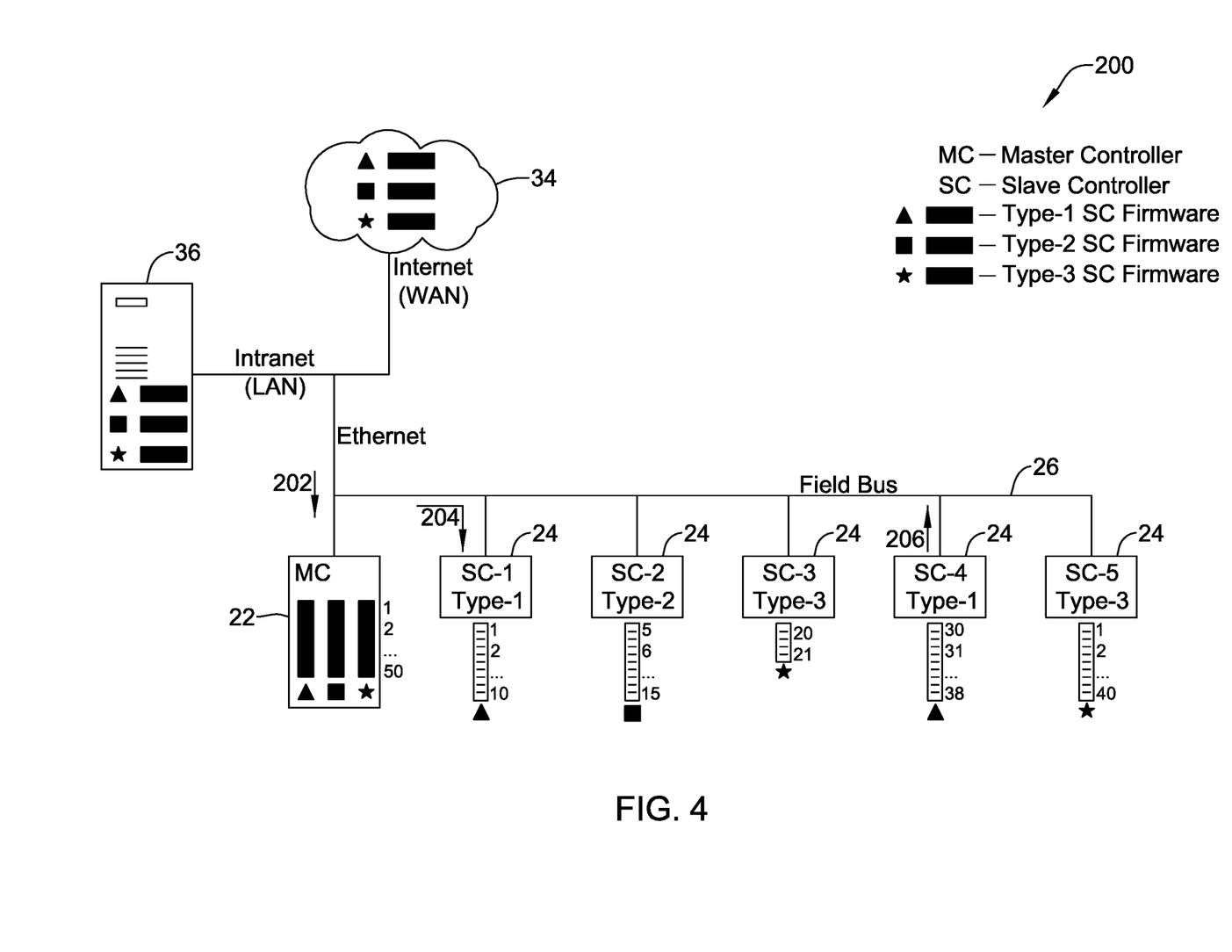
FIG. 4 is a flow diagram of a method in accordance with disclosed embodiments.

FIG. 4 is a flow diagram of a method 200 in accordance with disclosed embodiments. The plurality of slave controllers 24 can include different types of devices that can require different firmware code. Accordingly, the master controller 22 can download (1) a plurality of firmware update files and (2) an associated metadata file for each of the plurality of firmware update files, as in 202. As shown in FIG. 4, a first of the plurality of slave controllers 24 of a first type can download the plurality of packets in a first of the plurality of firmware update files corresponding to the first type from a combination of only the master controller 22 and any other of the plurality of slave controllers 24 of the first type, as in 204 and 206. In a similar manner, each of the plurality of slave controllers 24 can download the plurality of packets in each of the plurality of firmware update files corresponding to a respective type of that one of the plurality of slave controllers 24 from the combination of only the master controller 22 and any other of the plurality of slave controllers 24 of that type.

Alternatively, the master controller 22 can download a single firmware update file and a single metadata file, wherein some of the plurality of packets in the single firmware update file are for the first type of the plurality of slave controllers 24, other ones of the plurality of packets in the single firmware update file are for a second type of the plurality of slave controllers, and so on. In such embodiments, the first of the plurality of slave controllers 24 of the first type can download only those of the plurality of packets that are for the first type in the single firmware update file, but can download those packets from the combination of the plurality of slave controllers 24 and any other of the plurality of slave controllers 24 of the first type.

Figure 5:
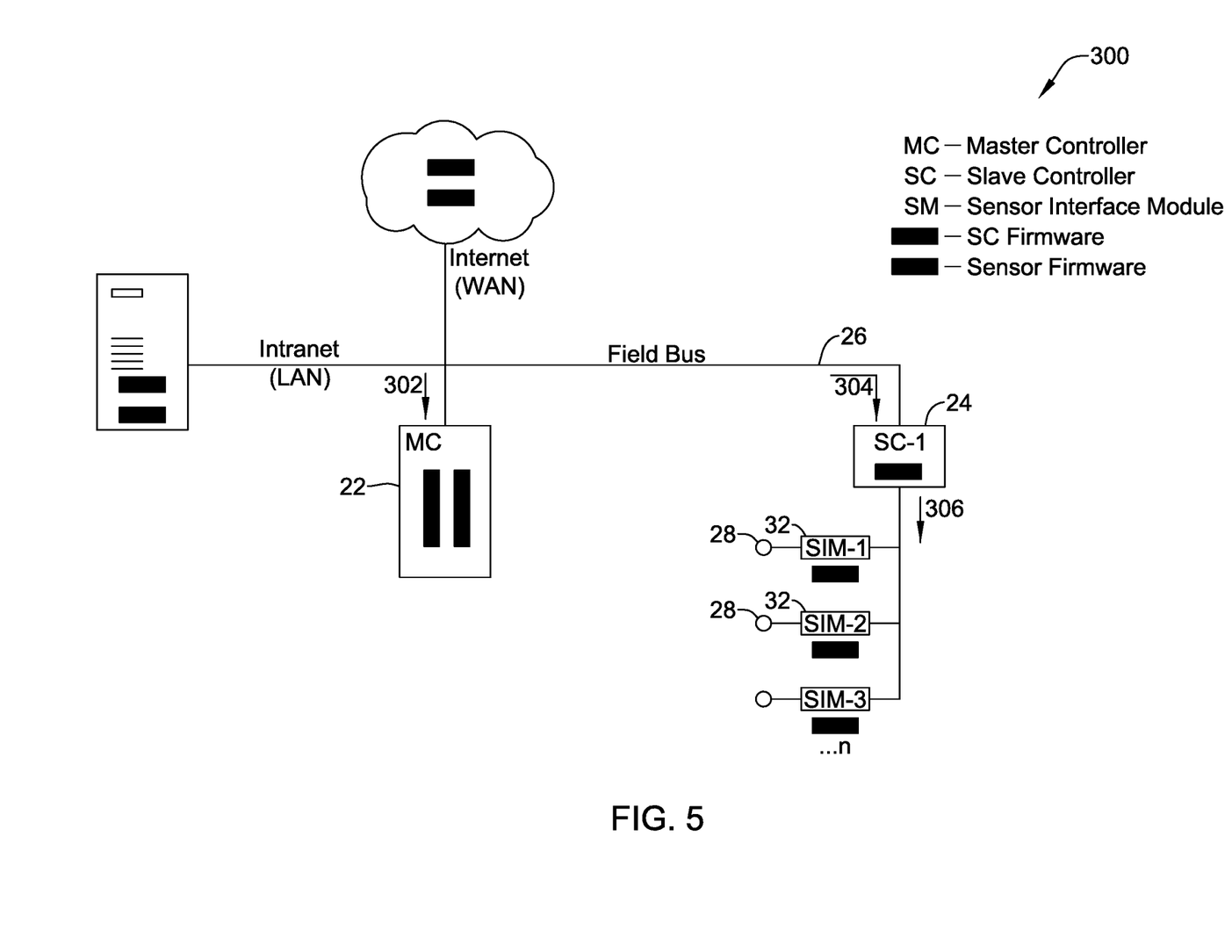
FIG. 5 is a flow diagram of a method in accordance with disclosed embodiments.

FIG. 5 is a flow diagram of a method 300 in accordance with disclosed embodiments. As in the method 200, in the method 300, the master controller 22 can download (1) a plurality of firmware update files and (2) an associated metadata file for each of the plurality of firmware update files, as in 302. As shown in FIG. 5, the first of the plurality of slave controllers 24 of the first type (control panel) can download the plurality of packets in the first of the plurality of firmware update files corresponding to the first type as well as the plurality of packets in a second of the plurality of firmware update files corresponding to the second type (sensors or sensor interface modules) that are coupled to the first of the plurality of slave controllers 24 of the first type, such as those with no alternate route to the master controller 22 or other download source, as in 304. Then, each of the plurality of slave controllers 28, 32 of the second type can download the plurality of packets in the second of the plurality of firmware update files corresponding to the second type from the first of the plurality of slave controllers 24 of the first type, as in 306.

Alternatively, the master controller 22 can download the single firmware update file and the single metadata file, wherein some of the plurality of packets in the single firmware update file are for the first type of the plurality of slave controllers 24 and other ones of the plurality of packets are for the second type of the plurality of slave controllers. In such embodiments, the first of the plurality of slave controllers 24 of the first type can download those of the plurality of packets in the single firmware update file that are for both the first type and the second type, and each of the plurality of slave controllers 28, 32 of the second type can download only those of the plurality of packets in the single firmware update file that are for the second type.

Figure 6:
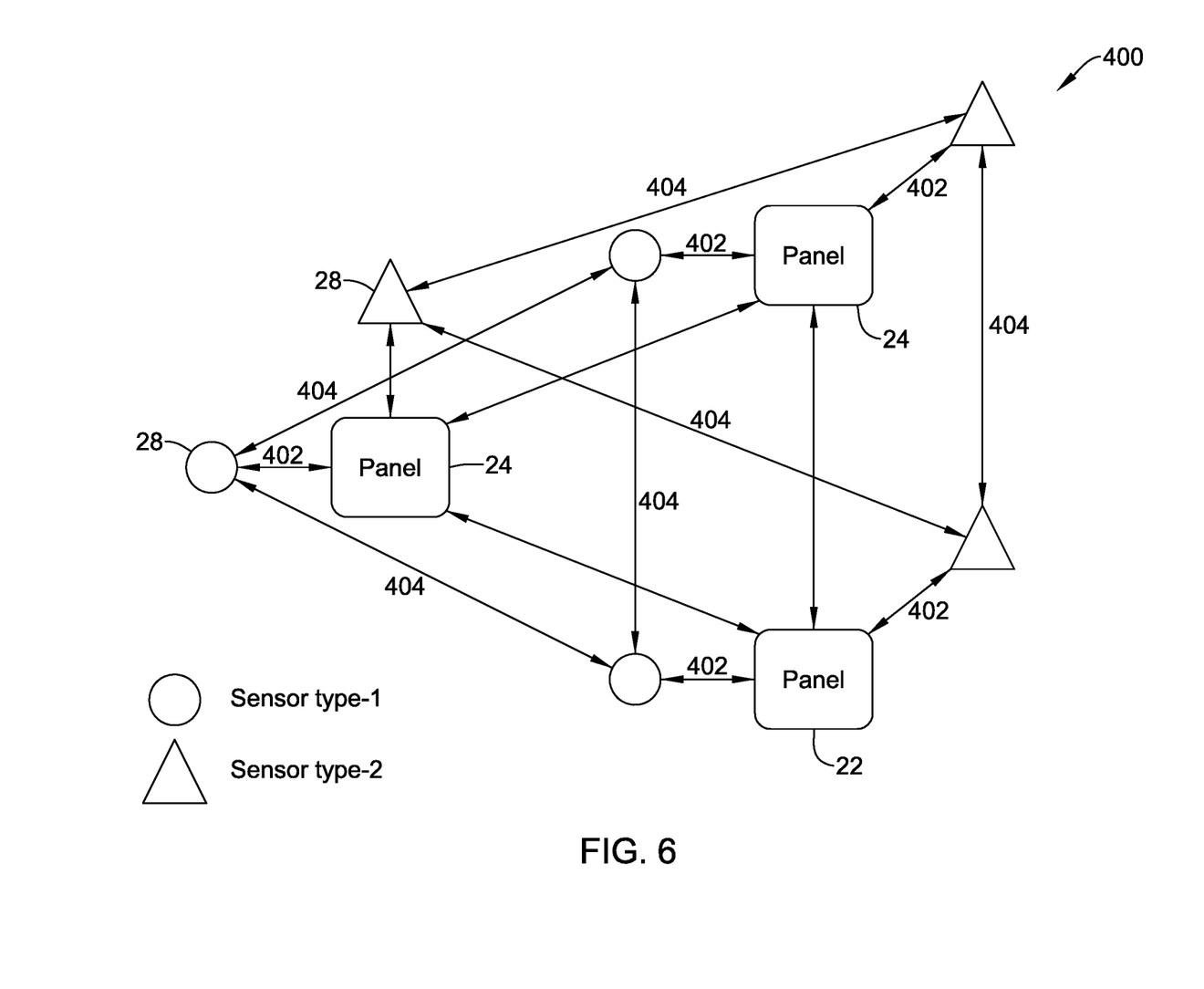
FIG. 6 is a flow diagram of a method in accordance with disclosed embodiments.

FIG. 6 is a flow diagram of a method 400 in accordance with disclosed embodiments. As shown in FIG. 6, the plurality of slave controllers 28 can download some of the plurality of packets in the firmware update file from the master controller 22 and the plurality of slave controllers 24, as in 402. However, the plurality of slave controllers 28 can also download some of the plurality of packets in the firmware update file from other ones of the plurality of slave controllers 28 of a matching type as in 404, regardless of where those other ones of the plurality of slave controllers 28 received the plurality of packets downloaded thereto.

In some embodiments, the method 400 can be used to download critical controller and sensor data, such as configuration and operational parameters, to each of the master controller 24 and the plurality of slave controllers 24, 28 based on type. For example, each of the master controller 24 and the plurality of slave controllers 24 can have a respective subset of the plurality of slave controllers 28 that includes multiple types connected thereto (see also FIG. 1). However, as seen in FIG. 6, matching types of the plurality of slave controllers 28 (sensors) can also be connected via subnetworks of the field bus 26 to facilitate a peer to peer virtual connection between the matching types of the plurality of slave controllers 28 across the field bus 26, as in 404. This feature can improve peer to peer data transfer performance by better enabling the system 20 to find the matching types of the plurality of slave controllers 28 across the subnetworks and a nearest device, even if located on a separate one of the subnetworks. In addition, this feature can provide added security because the master controller 22 and the plurality of slave controllers 24 can authenticate devices before establishing the peer to peer virtual connection between the matching types of the plurality of slave controllers 28.

It is to be understood that each of the local server, the cloud server, the master controller, and the plurality of slave controllers disclosed herein can include a respective transceiver device and a respective memory device, each of which can be in communication with respective control circuitry, one or more respective programmable processors, and respective executable control software as would be understood by one of ordinary skill in the art. In some embodiments, the respective executable control software of any of the local server, the cloud server, the master controller, and the plurality of slave controllers can be stored on a respective transitory or non-transitory computer readable medium, including, but not limited to respective local computer memory, respective RAM, respective optical storage media, respective magnetic storage media, respective flash memory, and the like, and some or all of the respective control circuitry, the respective programmable processors, and the respective executable control software of any of the local server, the cloud server, the master controller, and the plurality of slave controllers can execute and control at least some of the methods described herein.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a master controller including a memory; and
   a plurality of slave controllers, each including a memory,
   wherein the master controller receives a firmware update file and a metadata file associated with the firmware update file,
   wherein the firmware update file is divided into a plurality of packets,
   wherein a first one of the plurality of slave controllers receives the metadata file,
   wherein, responsive to receiving the metadata file, the first one of the plurality of slave controllers updates a slave local peer table to include entries for the master controller and a group of the plurality of slave controllers that are available to share any of the plurality of packets and to identify which ones of the plurality of packets are available to download from each of the master controller and the group of the plurality of slave controllers, and
   wherein the first one of the plurality of slave controllers downloads the plurality of packets from a combination of the master controller and the group of the plurality of slave controllers,
   wherein the metadata file includes address information for the plurality of slave controllers, wherein the master controller uses the address information to identify and update a master local peer table with nearest ones of the plurality of slave controllers to the master controller and to transmit the metadata file to the nearest ones of the plurality of slave controllers to the master controller, and wherein the first one of the plurality of slave controllers uses the address information to identify and update the slave local peer table with nearest ones of the master controller and the plurality of slave controllers to the first one of the plurality of slave controllers and to transmit the metadata file to the nearest ones of the plurality of slave controllers to the first one of the plurality of slave controllers.

2. The system of claim 1 wherein each of the plurality of packets is encoded to a respective key identified in the metadata file, and wherein the first one of the plurality of slave controllers uses the respective key for each of the plurality of packets in the metadata file to track which ones of the plurality of packets have been downloaded to the first one of the plurality of slave controllers.

3. The system of claim 1 wherein a broadcasting one of the master controller and the plurality of slave controllers updates the metadata file prior to transmission thereof to identify to which of the plurality of slave controllers the broadcasting one of the master controller and the plurality of slave controllers has transmitted any of the plurality of packets in the firmware update file and which ones of the plurality of packets in the firmware update file the broadcasting one of the master controller and the plurality of slave controllers has transmitted to each of the plurality of slave controllers.

4. The system of claim 1 wherein, when more than one of the master controller and the group of the plurality of slave controllers are available to share one of the plurality of packets in the firmware update file, the first one of the plurality of slave controllers uses the slave local peer table to identify which of the master controller and the group of the plurality of slave controllers to download the one of the plurality of packets in the firmware update file therefrom by identifying nearest ones of the master controller and the plurality of slave controllers to the first one of the plurality of slave controllers.

5. The system of claim 1 wherein each of the master controller and the plurality of slave controllers transmits a respective broadcast message that identifies a respective processing load of a respective processor of a respective one of the master controller and the plurality of slave controllers transmitting the respective broadcast message.

6. The system of claim 5 wherein, when more than one of the master controller and the group of the plurality of slave controllers are available to share one of the plurality of packets in the firmware update file, the first one of the plurality of slave controllers uses the slave local peer table to identify which of the master controller and the group of the plurality of slave controllers to download the one of the plurality of packets in the firmware update file therefrom by identifying a least loaded one of the master controller and the plurality of slave controllers.

7. The system of claim 1 wherein the firmware update file is specific to one device type, wherein the metadata file includes an internal designation of the one device type, and wherein the plurality of slave controllers matching the one device type download the firmware update file while the plurality of slave controllers failing to match the one device abstain from downloading the firmware update file.

8. The system of claim 1 wherein the master controller includes a first control panel, and wherein the plurality of slave controllers includes a plurality of other control panels or a plurality of sensors.

9. The system of claim 1 wherein the master controller receives the firmware update file and the metadata file from a local server via a local area network or a cloud sever via a wide area network.

10. A method comprising:
    a master controller receiving a firmware update file and a metadata file associated with the firmware update file, the firmware update file being divided into a plurality of packets, the metadata file including address information for a plurality of slave controllers;
    the master controller using the address information to identify and update a master local peer table with nearest ones of the plurality of slave controllers to the master controller and to transmit the metadata file to the nearest ones of the plurality of plurality of slave controllers to the master controller;
    a first one of the plurality of slave controllers receiving the metadata file;
    responsive to receiving the metadata file, the first one of the plurality of slave controllers updating a slave local peer table to include entries for the master controller and a group of the plurality of slave controllers that are available to share any of the plurality of packets and to identify which ones of the plurality of packets are available to download from each of the master controller and the group of the plurality of slave controllers, the first one of the plurality of slave controllers using the address information to identify and update the slave local peer table with nearest ones of the master controller and the plurality of slave controllers to the first one of the plurality of slave controllers and to transmit the metadata file to the nearest ones of the plurality of slave controllers to the first one of the plurality of slave controllers; and the first one of the plurality of slave controllers downloading the plurality of packets from a combination of the master controller and the group of the plurality of slave controllers.

11. The method of claim 10 further comprising:

encoding each of the plurality of packets to a respective key identified in the metadata file;

the first one of the plurality of slave controllers using the respective key for each of the plurality of packets in the metadata file to track which ones of the plurality of packets have been downloaded to the first one of the plurality of slave controllers.

12. The method of claim 10 further comprising a broadcasting one of the master controller and the plurality of slave controllers updating the metadata file prior to transmission thereof to identify to which of the plurality of slave controllers the broadcasting one of the master controller and the plurality of slave controllers has transmitted any of the plurality of packets in the firmware update file and which ones of the plurality of packets in the firmware update file the broadcasting one of the master controller and the plurality of slave controllers has transmitted to each of the plurality of slave controllers.

13. The method of claim 10 further comprising when more than one of the master controller and the group of the plurality of slave controllers are available to share one of the plurality of packets in the firmware update file, the first one of the plurality of slave controllers using the slave local peer table to identify which of the master controller and the group of the plurality of slave controllers to download the one of the plurality of packets in the firmware update file therefrom by identifying nearest ones of the master controller and the plurality of slave controllers to the first one of the plurality of slave controllers.

14. The method of claim 10 further comprising each of the master controller and the plurality of slave controllers transmitting a respective broadcast message that identifies a respective processing load of a respective processor of a respective one of the master controller and the plurality of slave controllers transmitting the respective broadcast message.

15. The method of claim 14 further comprising, when more than one of the master controller and the group of the plurality of slave controllers are available to share one of the plurality of packets in the firmware update file, the first one of the plurality of slave controllers using the slave local peer table to identify which of the master controller and the group of the plurality of slave controllers to download the one of the plurality of packets in the firmware update file therefrom by identifying a least loaded one of the master controller and the plurality of slave controllers.

16. The method of claim 10 wherein the firmware update file is specific to one device type, wherein the metadata file includes an internal designation of the one device type, and wherein the plurality of slave controllers matching the one device type download the firmware update file while the plurality of slave controllers failing to match the one device abstain from downloading the firmware update file.

17. The method of claim 10 wherein the master controller includes a first control panel, and wherein the plurality of slave controllers includes a plurality of other control panels or a plurality of sensors.

18. The method of claim 10 further comprising the master controller receiving the firmware update file and the metadata file from a local server via a local area network or a cloud sever via a wide area network.

* * * * *